US012535194B2

(12) United States Patent
Fujita et al.

(10) Patent No.: US 12,535,194 B2
(45) Date of Patent: Jan. 27, 2026

(54) VEHICLE LAMP

(71) Applicant: KOITO MANUFACTURING CO., LTD., Tokyo (JP)

(72) Inventors: Shoji Fujita, Shizuoka (JP); Akinori Matsumoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/723,946

(22) PCT Filed: Dec. 16, 2022

(86) PCT No.: PCT/JP2022/046344
§ 371 (c)(1),
(2) Date: Jan. 22, 2025

(87) PCT Pub. No.: WO2023/127540
PCT Pub. Date: Jul. 6, 2023

(65) Prior Publication Data

US 2025/0146637 A1 May 8, 2025

(30) Foreign Application Priority Data

Dec. 28, 2021 (JP) ................................ 2021-213991

(51) Int. Cl.
*F21S 41/26* (2018.01)
*F21S 41/143* (2018.01)
(Continued)

(52) U.S. Cl.
CPC ............ *F21S 41/26* (2018.01); *F21S 41/143* (2018.01); *F21S 41/147* (2018.01);
(Continued)

(58) Field of Classification Search
CPC ..... F21S 41/141–153; F21S 41/25–295; F21S 41/30–32; F21S 41/50–55;
(Continued)

(56) References Cited

U.S. PATENT DOCUMENTS 7,168,832 B2 * 1/2007 Komatsu ............... F21S 41/255 362/334
9,851,063 B2 * 12/2017 Sakashita .............. F21S 41/321
(Continued)

FOREIGN PATENT DOCUMENTS

JP 2015076374 A 4/2015
JP 2016015215 A 1/2016
(Continued)

OTHER PUBLICATIONS

International Search Report dated Jan. 24, 2023 filed in PCT/JP2022/046344.

*Primary Examiner* — Jason M Han
(74) *Attorney, Agent, or Firm* — Rankin, Hill & Clark LLP

(57) ABSTRACT

A vehicle lamp including a projection lens, which is configured so that the brightness of a light distribution pattern can be sufficiently ensured while achieving a lamp design in which the projection lens looks narrow in a lamp front view. The projection lens includes an emission surface having a vertically-long outer shape in the lamp front view. The light source unit is configured to cause light emitted from a light emitting element to be reflected by a reflector and enter the projection lens as light converging in a lamp left-right direction. The projection lens includes an incident surface formed wider than the emission surface and a pair of left and right standing wall surfaces formed so as to expand to both left and right sides while extending from both side edges of the emission surface toward a lamp rear.

6 Claims, 7 Drawing Sheets

(51) Int. Cl.

| | |
|---|---|
| ***F21S 41/147*** | (2018.01) |
| ***F21S 41/20*** | (2018.01) |
| ***F21S 41/255*** | (2018.01) |
| ***F21S 41/32*** | (2018.01) |
| ***F21W 102/135*** | (2018.01) |
| ***F21Y 115/10*** | (2016.01) |

(52) U.S. Cl.
CPC ........... *F21S 41/255* (2018.01); *F21S 41/285* (2018.01); *F21S 41/32* (2018.01); *F21W 2102/135* (2018.01); *F21Y 2115/10* (2016.08)

(58) Field of Classification Search
CPC ....... F21W 2102/10–19; F21Y 2115/10; F21Y 2115/30
See application file for complete search history.

(56) References Cited

U.S. PATENT DOCUMENTS

| | | | | |
|---|---|---|---|---|
| 10,859,224 | B2 * | 12/2020 | Shibata ................. | F21S 41/155 |
| 2015/0103549 | A1 | 4/2015 | Sakashita | |
| 2016/0003437 | A1 | 1/2016 | Sakashita et al. | |

FOREIGN PATENT DOCUMENTS

| | | | |
|---|---|---|---|
| JP | 2016085792 | A | 5/2016 |
| JP | 2020149877 | A | 9/2020 |

* cited by examiner

VEHICLE LAMP

TECHNICAL FIELD

The invention of the present application relates to a vehicle lamp including a projection lens.

BACKGROUND ART

Conventionally, as the configuration of a vehicle lamp, there has been known a configuration in which a required light distribution pattern is formed by emitting light from a light source unit to a lamp front through a projection lens.

“Patent Literature 1” describes, as the configuration of the projection lens in such a vehicle lamp, a projection lens configured such that an emission surface thereof has a vertically-long outer shape in a lamp front view.

The projection lens of the vehicle lamp described in “Patent Literature 1” has a configuration including a pair of left and right standing wall surfaces extending from both side edges of the emission surface toward a lamp rear.

CITATION LIST

Patent Literature

Patent Literature 1: JP-A-2016-15215

SUMMARY OF INVENTION

Problems to be Solved by Invention

By employing the configuration described in “Patent Literature 1” above, it is possible to achieve a lamp design in which the projection lens looks narrow in the lamp front view.

However, in the projection lens described in “Patent Literature 1” above, since the horizontal width of an incident surface is narrowed as in the emission surface, it is not easy to sufficiently take light emitted from the light source unit into the projection lens, and for this reason, it is not easy to sufficiently ensure the brightness of a light distribution pattern formed by light emitted from the vehicle lamp.

The invention of the present application has been made in view of such circumstances, and an object of the invention is to provide, as a vehicle lamp including a projection lens, a vehicle lamp capable of sufficiently ensuring the brightness of a light distribution pattern while achieving a lamp design in which the projection lens looks narrow in a lamp front view.

Solution to Problems

The invention of the present application aims to achieve the above-described object by devising the configuration of the projection lens.

That is, a vehicle lamp according to the invention of the present application is a vehicle lamp configured to form a required light distribution pattern by emitting light from a light source unit toward a lamp front through a projection lens, the light source unit including a light source and an optical member configured to cause light emitted from the light source to enter the projection lens as light converging in a lamp left-right direction, and the projection lens including an emission surface having a vertically-long outer shape in a lamp front view, an incident surface formed wider than the emission surface, and a pair of left and right standing wall surfaces formed so as to expand to both left and right sides while extending from both side edges of the emission surface toward a lamp rear.

The “optical member” is configured to cause the light emitted from the light source to enter the projection lens as the light converging in the lamp left-right direction. However, as long as the light emitted from the light source enters the projection lens as the light converging in the lamp left-right direction as a whole, part of the light emitted from the light source may not necessarily be light directed in a converging direction.

The type of “light source” is not particularly limited, and for example, a light emitting element such as a light emitting diode or a laser diode or a light source valve can be employed.

Specific surface shape and outer shape of the “emission surface” are not particularly limited as long as the emission surface has a vertically-long outer shape in the lamp front view.

Specific surface shape and outer shape of the “incident surface” are not particularly limited as long as the incident surface is formed wider than the emission surface.

Specific surface shape and outer shape of the “standing wall surface” are not particularly limited as long as the standing wall surface is formed so as to expand to both left and right sides while extending from both side edges of the emission surface toward the lamp rear.

Effects of Invention

The vehicle lamp according to the invention of the present application is configured to emit the light from the light source unit toward the lamp front through the projection lens, and as the light source unit, the light emitted from the light source enters the projection lens as the light converging in the lamp left-right direction by the optical member. Since the projection lens includes the emission surface having a vertically-long outer shape in the lamp front view, the incident surface formed wider than the emission surface, and the pair of left and right standing wall surfaces formed so as to expand to both left and right sides while extending from both side edges of the emission surface toward the lamp rear, the following features and advantageous effects can be obtained.

That is, since the emission surface of the projection lens has a vertically-long outer shape in a lamp front view, it is possible to achieve a lamp design in which the projection lens looks narrow in a lamp front view.

In addition, since the incident surface of the projection lens is formed wider than the emission surface and the pair of left and right standing wall surfaces is formed so as to expand to both left and right sides while extending from both side edges of the emission surface toward the lamp rear, the light emitted from the light source unit and reaching the projection lens as the light converging in the lamp left-right direction can be efficiently taken in from the incident surface and guided to the emission surface. Thus, the brightness of the light distribution pattern formed by the light emitted from the vehicle lamp can be sufficiently ensured.

As described above, according to the invention of the present application, as the vehicle lamp including the projection lens, it is possible to sufficiently ensure the brightness of the light distribution pattern while achieving the lamp design in which the projection lens looks narrow in a lamp front view.

In the above-described configuration, further, the pair of left and right standing wall surfaces is configured such that a maximum interval between rear edges is set to a value 1.5 times or more a maximum interval between front edges, so that the light emitted from the light source unit can be easily sufficiently taken into the projection lens.

In the above-described configuration, further, each of the pair of left and right standing wall surfaces is configured such that an inclination angle with respect to a vertical plane extending in a lamp front-rear direction is set to a value within a range of 15 to 40°, so that it is possible to efficiently guide the light having entered from the incident surface to the emission surface while sufficiently ensuring the amount of light emitted from the light source unit and entering the projection lens.

In the above-described configuration, further, the emission surface is configured such that a maximum vertical width thereof is set to a value twice or more a maximum horizontal width, so that it is possible to easily achieve the lamp design in which the projection lens looks narrow in a lamp front view.

In the above-described configuration, further, a cover member for making at least part of the pair of left and right standing wall surfaces invisible in the lamp front view is disposed on a lamp front side of the projection lens, so that it is possible to emphasize the lamp design in which the projection lens looks narrow in a lamp front view.

DESCRIPTION OF EMBODIMENTS

Embodiments of the invention of the present application will be described hereinafter with reference to the drawings.

Figure 1:
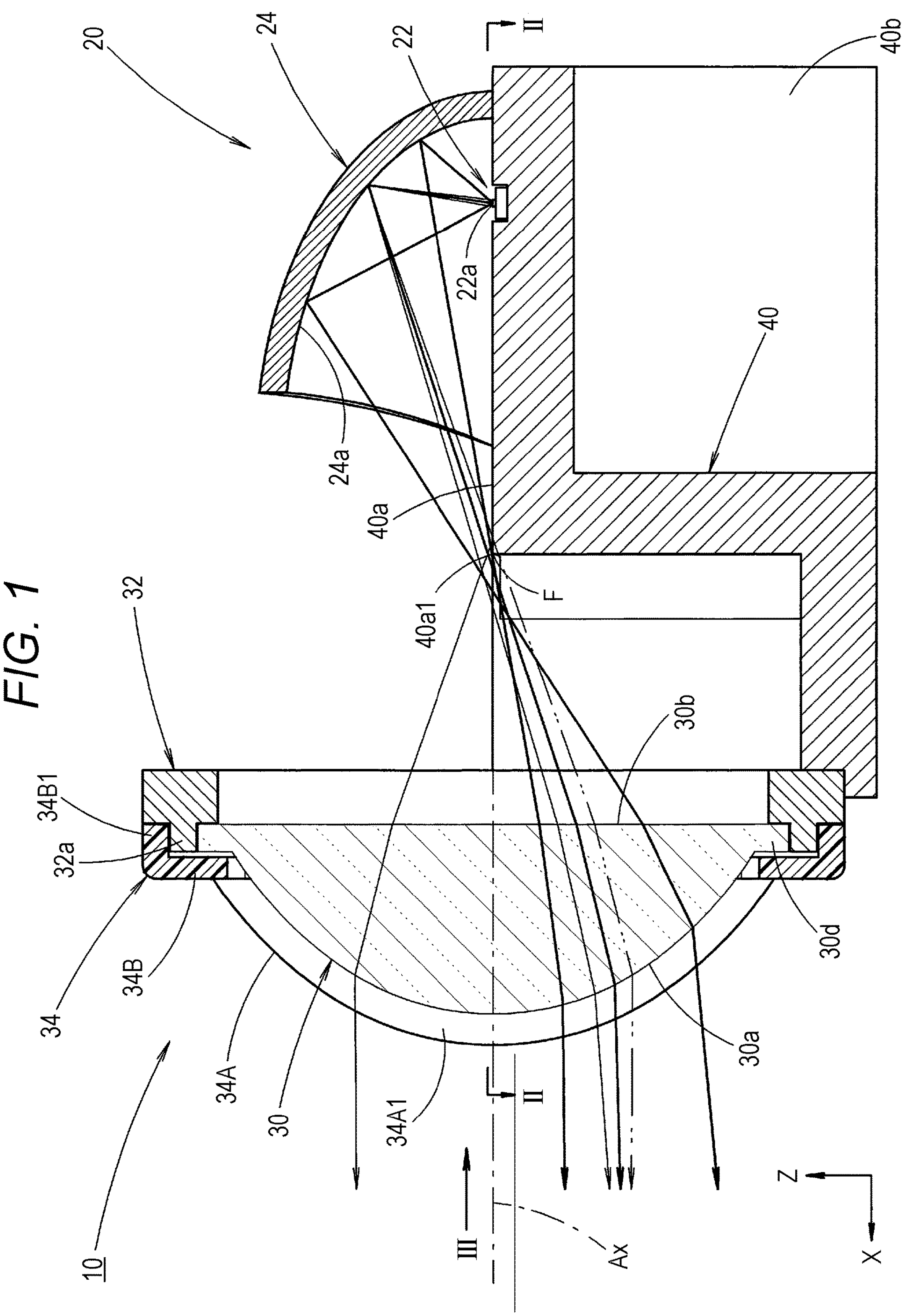
FIG. 1 is a side sectional view showing a vehicle lamp according to one embodiment of the invention of the present application.
Figure 2:
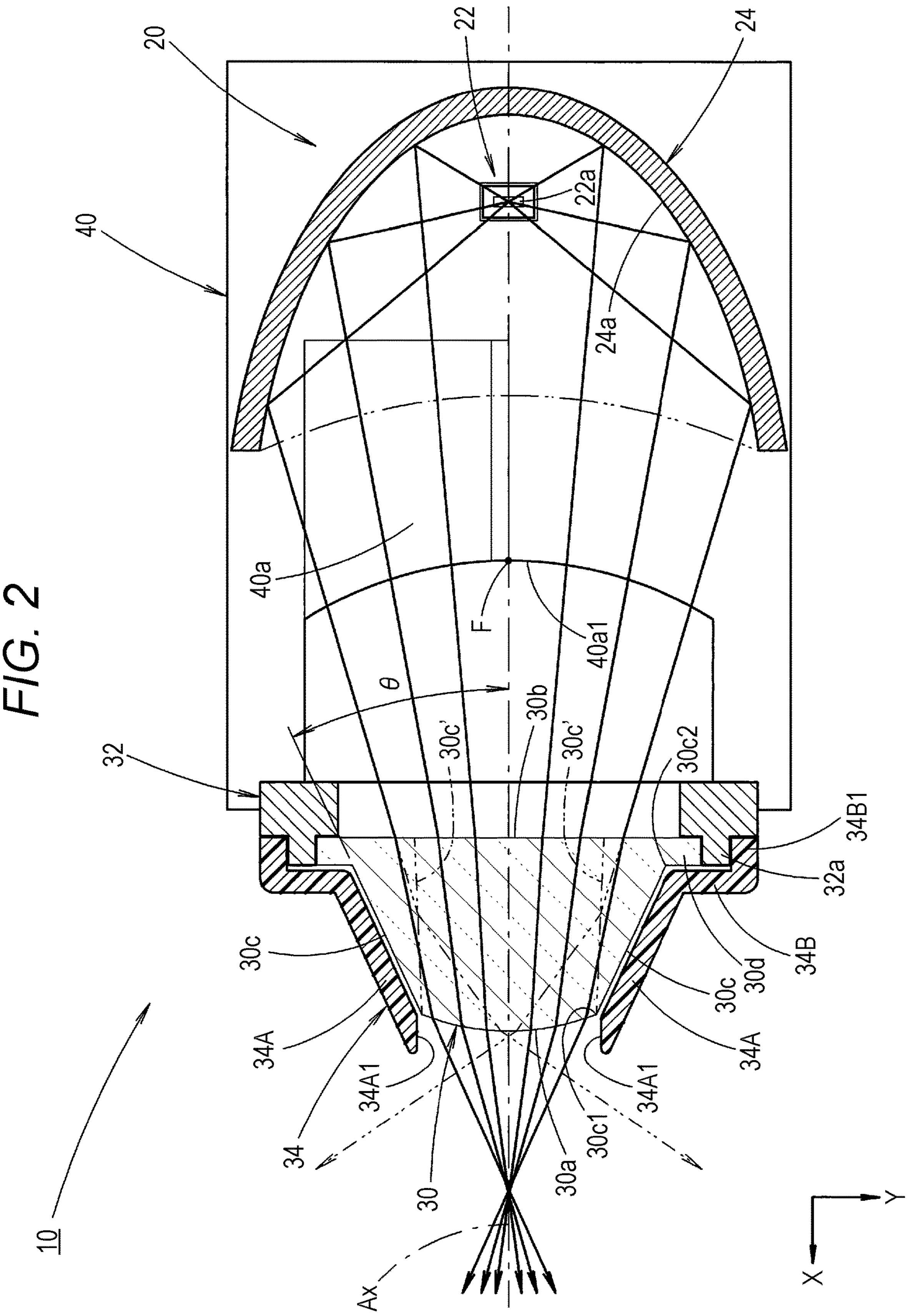
FIG. 2 is a sectional view taken along a line II-II in FIG. 1.

FIG. 1 is a side sectional view showing a vehicle lamp 10 according to one embodiment of the invention of the present application. FIG. 2 is a sectional view taken along a line II-II in FIG. 1, and FIG. 3 is a view from the direction of an arrow III in FIG. 1.

In these figures, a direction represented by X is a "lamp front," a direction represented by Y is a "left direction" ("right direction" in the lamp front view) perpendicular to the "lamp front," and a direction represented by Z is an "up direction." The same applies to figures other than these figures.

Figure 3:
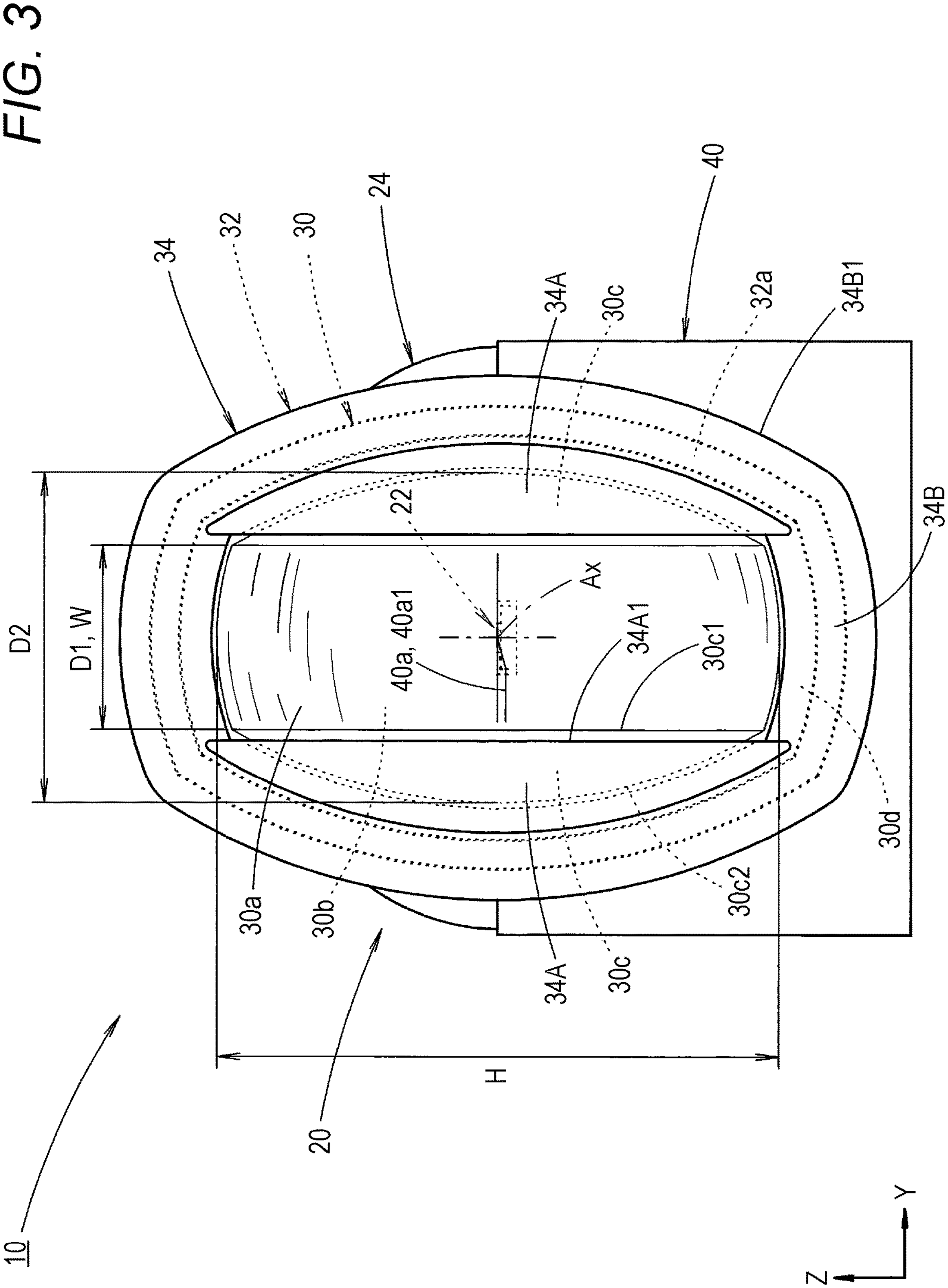
FIG. 3 is a view from the direction of an arrow III in FIG. 1.

As shown in FIGS. 1 to 3, the vehicle lamp 10 according to the present embodiment is a low beam lamp unit used in a state of being incorporated as part of a headlamp, and is configured as a projector type lamp unit.

That is, the vehicle lamp 10 includes a light source unit 20, a projection lens 30, and a base member 40 supporting these components, and is configured to form a low beam light distribution pattern (described later) by emitting light from the light source unit 20 toward the lamp front through the projection lens 30.

The projection lens 30 is a plano-convex aspherical lens having an optical axis Ax extending in the lamp front-rear direction, and an emission surface (i.e., front surface) 30*a* thereof is formed in a convex curved shape and an incident surface (i.e., rear surface) 30*b* thereof is formed in a planar shape. The projection lens 30 projects a light source image, which is formed on a rear focal plane as a focal plane including a rear focal point F, as an inverted image on a virtual vertical screen in the lamp front. Note that a specific configuration of the projection lens 30 will be described later. The light source unit 20 includes a light emitting element 22 as a light source and a reflector 24 as an optical member that causes light emitted from the light emitting element 22 to enter the projection lens 30 as light converging in the lamp left-right direction.

The light emitting element 22 is configured as a white light emitting diode having a horizontally-long rectangular light emitting surface 22*a*. The light emitting element 22 is disposed closer to a lamp rear side than the rear focal point F of the projection lens 30, and is mounted on the upper surface of the base member 40 in a state of the light emitting surface 22*a* facing upward on the optical axis Ax.

The reflector 24 is supported on the upper surface of the base member 40 at a lower edge portion thereof in a state of being disposed so as to cover the light emitting element 22 from above.

A reflecting surface 24*a* of the reflector 24 is formed of a curved surface having a substantially elliptical shape with the light emitting center of the light emitting element 22 as a first focal point, and the eccentricity thereof is set so as to gradually increase from the vertical section to the horizontal section. With this configuration, the reflector 24 converges light from the light emitting element 22 to a point located slightly in front of the rear focal point F in the vertical section, and moves such a convergence position considerably forward in the horizontal section.

In a state of the vehicle lamp 10 being incorporated into the headlamp, the optical axis Ax of the projection lens 30 is disposed in a state of extending downward by about 0.5 to 0.6° with respect to a vehicle front-rear direction.

The base member 40 is a metal member including a plurality of heat dissipation fins 40*b*, and functions as a heat sink that efficiently dissipates heat generated by the light emitting element 24.

At the upper surface of the base member 40, an upward reflecting surface 40*a* that reflects part of reflected light from the reflector 24 upward toward the projection lens 30 is formed in order to form a cutoff line of the low beam light distribution pattern. Of the upward reflecting surface 40*a*, a left region positioned on the left side (right side in the lamp front view) with respect to the optical axis Ax is a horizontal plane including the optical axis Ax, and a right region positioned on the right side with respect to the optical axis Ax is a horizontal plane one step lower than the left region with a short slope interposed therebetween. A front edge 40*a*1 of the upward reflecting surface 40*a* extends so as to curve forward from the rear focal point F toward both left and right sides.

The emission surface 30*a* of the projection lens 30 has a vertically-long outer shape in the lamp front view. Specifically, both upper and lower edges of the emission surface 30*a* are formed so as to extend along an are centered on the optical axis Ax in the lamp front view, and both side edges thereof are formed so as to extend in parallel with a vertical plane including the optical axis Ax (i.e., vertical plane extending in the lamp front-rear direction). In this configuration, the maximum vertical width H of the emission surface 30*a* is set to a value (e.g., value which is about three times) which is twice or more the maximum horizontal width (however, constant width in the present embodiment) W.

The incident surface 30*b* of the projection lens 30 is formed wider than the emission surface 30*a*. The projection lens 30 includes a pair of left and right standing wall surfaces 30*c* formed in a planar shape so as to expand to both left and right sides while extending from both side edges of the emission surface 30*a* toward the lamp rear.

The projection lens 30 includes an outer peripheral flange portion 30*d* formed so as to surround both upper and lower edges of the emission surface 30*a* and the rear edges of the pair of left and right standing wall surfaces 30*c* in the lamp front view. The outer peripheral flange portion 30*d* is formed to have a constant width and a constant thickness, and the rear surface thereof is formed flush with the incident surface 30*b*.

Of each of the pair of left and right standing wall surfaces 30*c*, a front edge 30*c*1 which is an intersection line with the emission surface 30*a* is formed so as to extend in parallel with the vertical plane including the optical axis Ax, and a rear edge 30*c*2 which is an intersection line with the outer peripheral flange portion 30*d* is formed so as to bulge in an arc shape toward both left and right sides. In this configuration, the pair of left and right standing wall surfaces 30*c* is configured such that the maximum interval D2 between the rear edges 30*c*2 is set to a value (e.g., value of about twice) which is 1.5 times or more the maximum interval (however, constant interval in the present embodiment) D1 between the front edges 30*c*1.

As shown in FIG. 2, each of the pair of left and right standing wall surfaces 30*c* is configured such that an inclination angle θ with respect to the vertical plane including the optical axis Ax is set to a value (e.g., value of about) 25° within a range of 15 to 40° (more preferably 20 to) 30°.

The projection lens 30 is supported on a lens holder 32 at the outer peripheral flange portion 30*d*, and the lens holder 32 is supported on the base member 40.

The lens holder 32 has a configuration in which an annular protruding portion 32*a* surrounding the outer peripheral flange portion 30*d* of the projection lens 30 is formed on the front surface thereof, thereby supporting the projection lens 30 in a state of the projection lens 30 being positioned.

On the lamp front side of the projection lens 30, a cover member 34 for making substantially the entire region of the pair of left and right standing wall surfaces 30*c* invisible in the lamp front view is disposed.

The cover member 34 is an opaque resin member, and includes a pair of left and right side wall surface portions 34A formed so as to extend along the pair of left and right standing wall surfaces 30*c* and a base end portion 34B formed so as to surround the pair of left and right standing wall surfaces 30*c* and the outer peripheral flange portion 30*d* at the rear end positions of the pair of left and right side wall surface portions 34A.

The pair of left and right side wall surface portions 34A is formed in a flat plate shape, and inner surfaces 34A1 of front end portions thereof are formed so as to extend along the vertical plane parallel with the optical axis Ax in the vicinity of both left and right sides of the front edges 30*c*1 of the pair of left and right standing wall surfaces 30*c*.

The base end portion 34B is formed so as to extend in a flat plate shape along the vertical plane perpendicular to the optical axis Ax, and an annular flange portion 34B1 extending toward the lamp rear is formed at an outer peripheral edge portion thereof. In a state of the annular flange portion 34B1 being engaged with the outer peripheral surface of the annular protruding portion 32*a* of the lens holder 32 on the inner peripheral surface thereof, the rear end surface of the annular flange portion 34B1 is in contact with the front surface of the lens holder 32. With this configuration, the cover member 34 is positioned with respect to the lens holder 32.

As described above, since the incident surface 30*b* of the projection lens 30 is formed wider than the emission surface 30*a*, reflected light from the reflector 24 is taken into the projection lens 30 over a wide area. In this configuration, the pair of left and right standing wall surfaces 30*c* is formed so as to expand to both left and right sides while extending from both side edges of the emission surface 30*a* toward the lamp rear. However, since reflected light from the reflector 24 reaches the incident surface 30*b* of the projection lens 30 as light converging in the lamp left-right direction, light having entered the projection lens 30 from the incident surface 30*b* reaches the emission surface 30*a* without reaching the pair of left and right standing wall surfaces 30*c*.

On the other hand, in the configuration of the projection lens 30, if the incident surface 30*b* is also narrowed in the left-right direction as in the emission surface 30*a* (i.e., as indicated by a two-dot chain line in FIG. 2, a pair of left and right standing wall surfaces 30*c*' is formed so as to slightly expand to both left and right sides while extending from both side edges of the emission surface 30*a* toward the lamp rear), reflected light from both left and right end regions of the reflecting surface 24*a* of the reflector 24 is not taken into the projection lens 30 as incident light from the incident surface 30*b*, enters the projection lens 30 from the pair of left and right standing wall surfaces 30*c*' as in an optical path indicated by the two-dot chain line in FIG. 2, and is then emitted as stray light (i.e., light which does not contribute to formation of the low beam light distribution pattern) from the emission surface 30*a* toward the lamp front.

Figure 4:
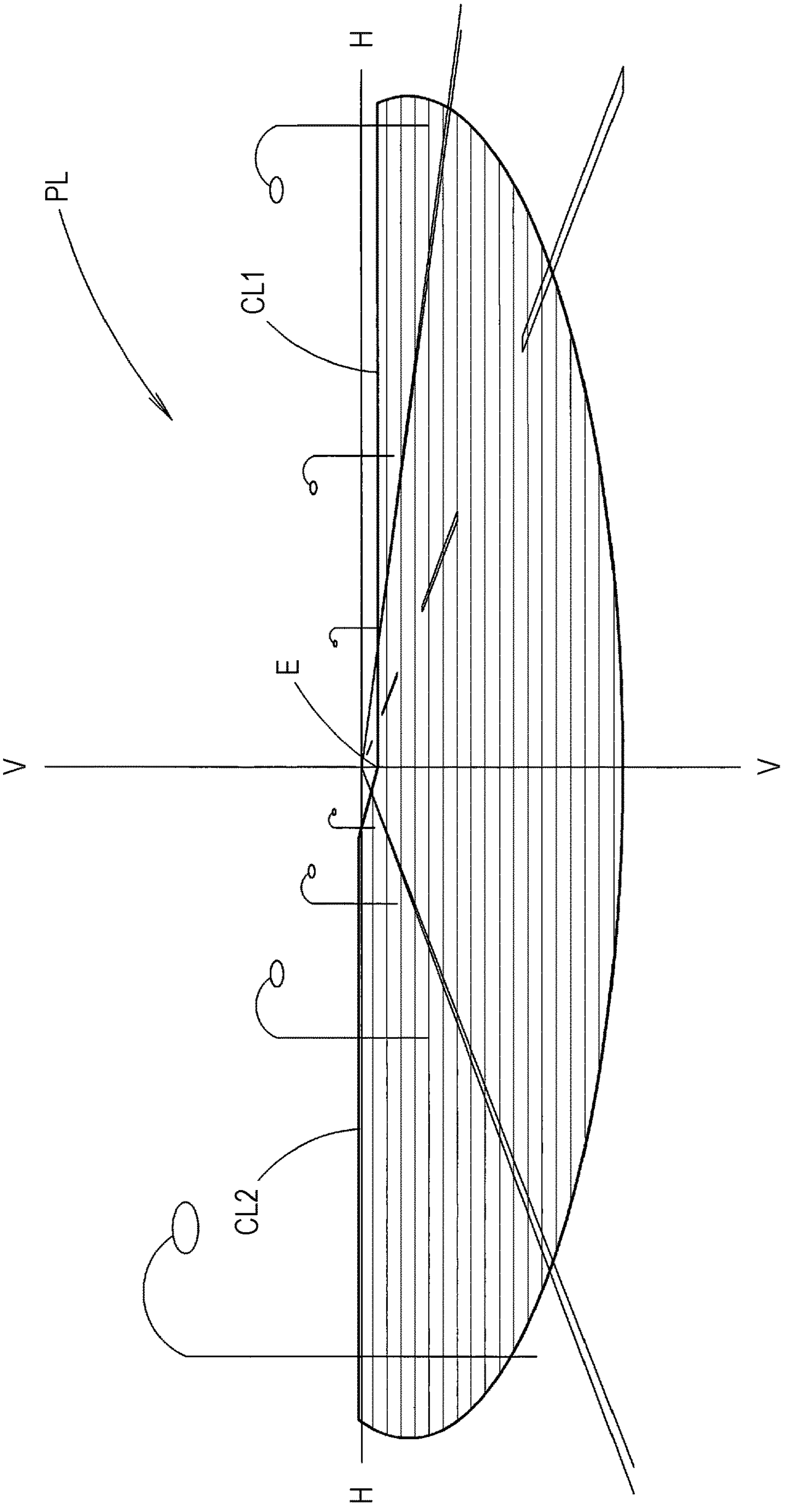
FIG. 4 is a perspective view showing a low beam light distribution pattern formed by light emitted from the vehicle lamp.

FIG. 4 is a perspective view showing a low beam light distribution pattern PL which is formed by light emitted from the vehicle lamp 10 on a virtual vertical screen disposed at a position 25 m ahead of the lamp.

The low beam light distribution pattern PL is a low beam light distribution pattern of left light distribution, and at the upper edge thereof, has cutoff lines CL1, CL2 at different heights on the left and right sides. The cutoff lines CL1, CL2 extend in the horizontal direction at different heights on the left and right sides across a line V-V passing in the vertical direction through H-V, which is a vanishing point in the lamp front direction. An opposite lane portion on the right side with respect to the line V-V is formed as the lower cutoff line CL1, and a subject driving lane portion on the left side with respect to the line V-V is formed as the upper cutoff line CL2 one step higher than the lower cutoff line CL1 through an inclined portion.

The low beam light distribution pattern PL is formed by projecting a light source image of the light emitting element 22 formed on the rear focal plane of the projection lens 30 by the light emitted from the light emitting element 22 and reflected by the reflector 24 as an inverted projection image on the virtual vertical screen by the projection lens 30, and the cutoff lines CL1, CL2 are formed as an inverted projection image of the front edge 40*a*1 of the upward reflecting surface 40*a* of the base member 40.

In the low beam light distribution pattern PL, an elbow point E, which is an intersection point between the lower cutoff line CL1 and the line V-V, is positioned approximately 0.5 to 0.6° below H-V. This is because the optical axis Ax extends downward by about 0.5 to 0.6° with respect to the vehicle front-rear direction.

Next, the features and advantageous effects of the present embodiment will be described.

The vehicle lamp 10 according to the present embodiment is configured to emit the light from the light source unit 20 toward the lamp front through the projection lens 30, and as the light source unit 20, the light emitted from the light emitting element 22 (light source) is reflected by the reflector 24 (optical member) to enter the projection lens 30 as the light converging in the lamp left-right direction. Since the projection lens 30 includes the emission surface 30*a* having a vertically-long outer shape in the lamp front view, the incident surface 30*b* formed wider than the emission surface 30*a*, and the pair of left and right standing wall surfaces 30*c* formed so as to expand to both left and right sides while extending from both side edges of the emission surface 30*a* toward the lamp rear, the following features and advantageous effects can be obtained.

That is, since the emission surface 30*a* of the projection lens 30 has the vertically-long outer shape in the lamp front view, it is possible to achieve a lamp design in which the projection lens 30 looks narrow in a lamp front view.

In addition, since the incident surface 30*b* of the projection lens 30 is formed wider than the emission surface 30*a* and the pair of left and right standing wall surfaces 30*c* is formed so as to expand to both left and right sides while extending from both side edges of the emission surface 30*a* toward the lamp rear, the light emitted from the light source unit 20 and reaching the projection lens 30 as the light converging in the lamp left-right direction can be efficiently taken in from the incident surface 30*b* and guided to the emission surface 30*a*. Thus, the brightness of the low beam light distribution pattern PL formed by the light emitted from the vehicle lamp 10 can be sufficiently ensured.

As described above, according to the present embodiment, as the vehicle lamp 10 including the projection lens 30, it is possible to sufficiently ensure the brightness of the low beam light distribution pattern PL while achieving the lamp design in which the projection lens 30 looks narrow in a lamp front view.

In this configuration, in the present embodiment, since the maximum interval D2 between the rear edges 30*c*2 of the pair of left and right standing wall surfaces 30*c* is set to the value 1.5 times or more the maximum interval D1 between the front edges 30*c*1, the light emitted from the light source unit 20 can be easily sufficiently taken into the projection lens 30.

In addition, in the present embodiment, since each of the pair of left and right standing wall surfaces 30*c* is configured such that the inclination angle θ with respect to the vertical plane extending in the lamp front-rear direction is set to the value within a range of 15 to 40°, it is possible to efficiently guide the light having entered from the incident surface 30*b* to the emission surface 30*a* while sufficiently ensuring the amount of light emitted from the light source unit 20 and entering the projection lens 30.

Further, in the present embodiment, since the maximum vertical width H of the emission surface 30*a* is set to the value twice or more the maximum horizontal width W, it is possible to easily achieve the lamp design in which the projection lens 30 looks narrow in a lamp front view.

Moreover, in the present embodiment, since the cover member 34 for making substantially the entire region of the pair of left and right standing wall surfaces 30*c* invisible in the lamp front view is disposed on the lamp front side of the projection lens 30, it is possible to emphasize the lamp design in which the projection lens 30 looks narrow in a lamp front view.

In the above-described embodiment, it has been described that the cover member 34 is configured to make substantially the entire region of the pair of left and right standing wall surfaces 30*c* invisible in the lamp front view. However, the area where the pair of left and right standing wall surfaces 30*c* cannot be visually recognized can be arbitrarily set in the lamp configuration.

In the above-described embodiment, it has been described that the vehicle lamp 10 is configured to form the low beam light distribution pattern PL by the emitted light, but the vehicle lamp 10 may be configured to form other light distribution patterns (e.g., a high beam light distribution pattern, a fog lamp light distribution pattern, or a light distribution pattern formed in addition to a low beam light distribution pattern when a high beam light distribution pattern is formed).

Next, modifications of the above-described embodiment will be described.

First, first and second modifications of the above-described embodiment will be described.

Figure 5:
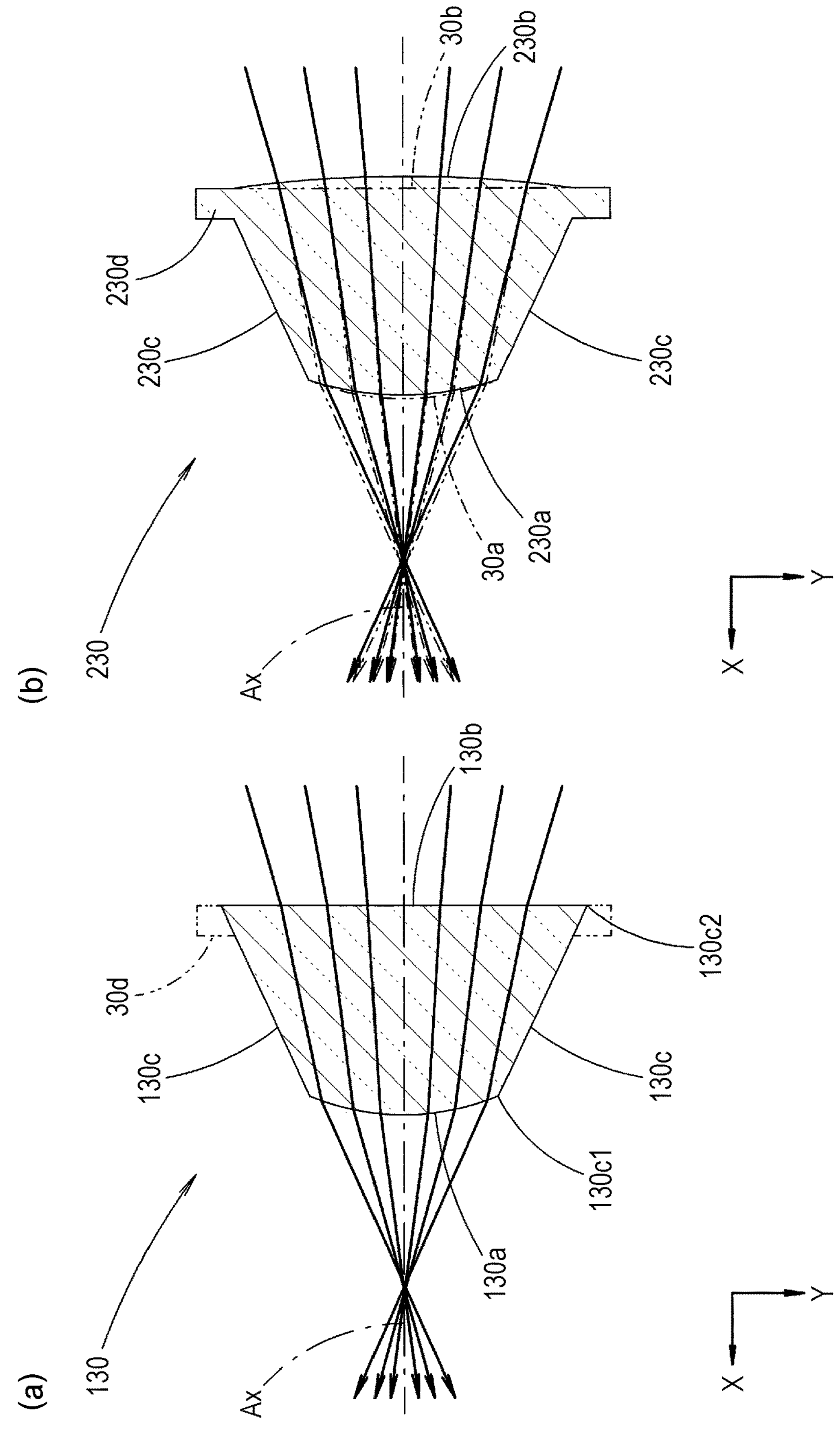
FIG. 5(*a*) is a horizontal sectional view showing a projection lens of a vehicle lamp according to a first modification of the embodiment alone, and FIG. 5(*b*) is a horizontal sectional view showing a projection lens of a vehicle lamp according to a second modification of the embodiment alone.

FIG. 5(*a*) is a view similar to FIG. 2, which shows a projection lens 130 of a vehicle lamp according to the present modification.

As shown in FIG. 5(*a*), the projection lens 130 of the present modification includes an emission surface 130*a* and an incident surface 130*b* similar to those of the projection lens 30 of the above-described embodiment, but is different from that of the above-described embodiment in that a pair of left and right standing wall surfaces 130*c* is formed so as to extend to the incident surface 130*b* while maintaining the same shape as that of the pair of left and right standing wall surfaces 130*c* of the projection lens 30 of the above-described embodiment.

That is, in the present modification, the front edges 130*c*1 of the pair of left and right standing wall surfaces 130*c* is positioned on an intersection line with the emission surface 130*a*, but the rear edges 130*c*2 thereof are positioned on an intersection line with the incident surface 130*b*.

Thus, unlike the projection lens 30 of the above-described embodiment, in the projection lens 130 of the present modification, the outer peripheral flange portion 30*d* is not formed with portions (portions indicated by a two-dot chain line in FIG. 5(*a*)) protruding to both left and right sides with respect to the pair of left and right standing wall surfaces 130*c*.

Since the incident surface 130*b* of the projection lens 130 of the present modification is also formed wider than the emission surface 130*a* and the pair of left and right standing wall surfaces 130*c* is formed so as to expand to both left and right sides while extending from both side edges of the emission surface 130*a* toward the lamp rear, light emitted from a light source unit (not shown) and reaching the projection lens 130 as light converging in the lamp left-right direction can be efficiently taken in from the incident surface 130*b* and guided to the emission surface 130*a*, as in the projection lens 30 of the above-described embodiment. Thus, it is possible to obtain features and advantageous effects similar to those of the above-described embodiment. Next, the second modification of the above-described embodiment will be described.

FIG. 5(b) is a view similar to FIG. 2, which shows a projection lens 230 of a vehicle lamp according to the present modification.

As shown in FIG. 5(b), as in the projection lens 30 of the above-described embodiment, the projection lens 230 of the present modification includes an emission surface 230*a*, an incident surface 230*b*, a pair of left and right standing wall surfaces 230*c*, and an outer peripheral flange portion 230*d*, but is configured as a biconvex aspherical lens instead of the plano-convex aspherical lens such as the projection lens 30 of the above-described embodiment.

Specifically, in the projection lens 230 of the present modification, both the emission surface 230*a* and the incident surface 230*b* are formed in a convex curved shape, but the refractive power thereof is set to the same value as that of the projection lens 30 of the above-described embodiment. That is, light reaching the projection lens 230 as light converging in the lamp left-right direction from a light source unit (not shown) travels in a direction closer to the optical axis Ax than that in the case of the above-described embodiment from the incident surface 230*b*, but a direction at the time of emission from the emission surface 230*a* is similar to that in the above-described embodiment.

Note that in FIG. 5(b), the emission surface 30*a* and incident surface 30*b* of the projection lens 30 of the above-described embodiment and an optical path of light having reached the projection lens 30 from the above-described light source unit are indicated by two-dot chain lines.

Since the incident surface 230*b* of the projection lens 230 of the present modification is also formed wider than the emission surface 230*a* and the pair of left and right standing wall surfaces 230*c* is formed so as to expand to both left and right sides while extending from both side edges of the emission surface 230*a* toward the lamp rear, light emitted from the above-described light source unit and reaching the projection lens 230 as light converging in the lamp left-right direction can be efficiently taken in from the incident surface 230*b* and guided to the emission surface 230*a*, as in the projection lens 30 of the above-described embodiment. Thus, it is possible to obtain features and advantageous effects similar to those of the above-described embodiment.

In particular, in the present modification, since the light emitted from the above-described light source unit and having reached the projection lens 230 travels in the direction closer to the optical axis Ax in the projection lens 230 than that in the case of the above-described embodiment, the inclination angle of the pair of left and right standing wall surfaces 230*c* can be increased accordingly.

Next, a third modification of the above-described embodiment will be described.

Figure 6:
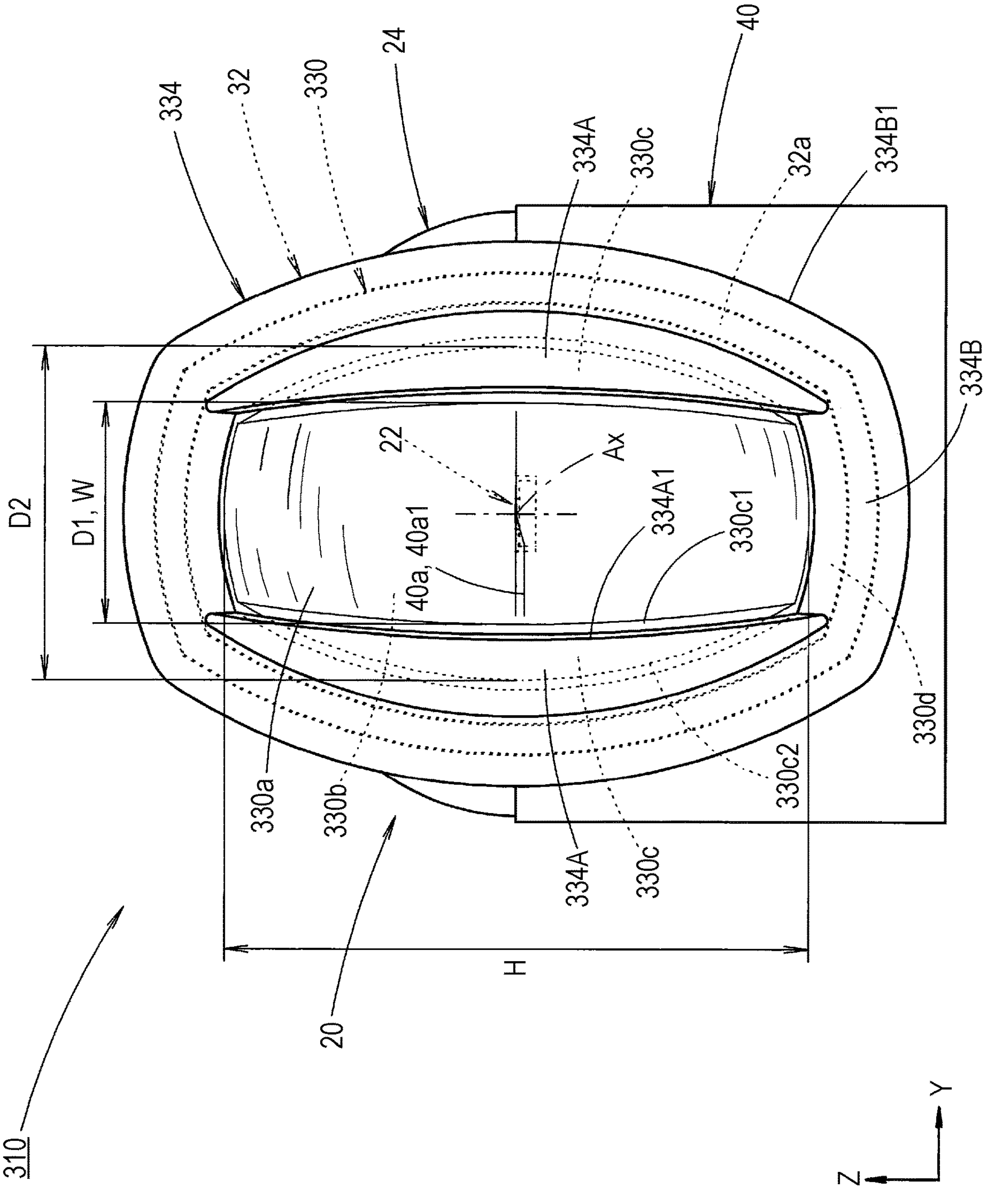
FIG. 6 is a view similar to FIG. 3, which shows a third modification of the embodiment.

FIG. 6 is a view similar to FIG. 3, which shows a vehicle lamp 310 according to the present modification.

As shown in FIG. 6, a basic configuration of the present modification is similar to that of the above-described embodiment, but the configurations of a projection lens 330 and a cover member 334 are different from those of the above-described embodiment.

That is, the projection lens 330 of the present modification is a plano-convex aspherical lens similar to the projection lens 30 of the above-described embodiment, and an emission surface 330*a* thereof has a vertically-long outer shape in the lamp front view, but both side edges thereof are formed so as to bulge in an arc shape toward both left and right sides. Accordingly, not only rear edges 330*c*2 but also front edges 330*c*1 of a pair of left and right standing wall surfaces 330*c* are formed in an arc shape, so that the pair of left and right standing wall surfaces 330*c* has a substantially conical surface shape.

Also in the present modification, the pair of left and right standing wall surfaces 330*c* is configured such that the maximum interval D2 between the rear edges 330*c*2 is set to a value 1.5 times or more the maximum interval D1 between the front edges 330*c*1 and the maximum vertical width H of the emission surface 330*a* is set to a value twice or more the maximum horizontal width W.

The configurations of an incident surface 330*b* and an outer peripheral flange portion 330*d* of the projection lens 330 of the present modification are also similar to those of the projection lens 30 of the above-described embodiment.

As in the cover member 34 of the above-described embodiment, the cover member 334 of the present modification includes a pair of left and right side wall surface portions 334A and a base end portion 334B, but the shape of the pair of left and right side wall surface portions 334A is different from that of the above-described embodiment.

That is, also in the cover member 334 of the present modification, the pair of left and right side wall surface portions 334A is formed so as to extend along the pair of left and right standing wall surfaces 330*c* of the projection lens 330, but extends in a plate shape along a substantially conical surface shape corresponding to the pair of left and right standing wall surfaces 330*c* formed in the substantially conical surface shape.

The pair of left and right side wall surface portions 334A of the cover member 334 of the present modification is also configured such that inner surfaces 334A1 of front end portions thereof are positioned in the vicinity of both left and right sides of the front edges 330*c*1 of the pair of left and right standing wall surfaces 330*c*, but are formed so as to extend in a direction of expanding toward the lamp front with respect to the vertical plane parallel with the optical axis Ax.

Note that the cover member 334 of the present modification also includes the base end portion 334B having a configuration similar to that of the above-described embodiment, and at an annular flange portion 334B1, the base end portion 334B is positioned with respect to the lens holder 32.

Even in a case of employing the configuration of the present modification, the emission surface 330*a* of the projection lens 330 has a vertically-long outer shape in the lamp front view, and therefore, it is possible to achieve a lamp design in which the projection lens 330 looks narrow in a lamp front view.

In this configuration, since the projection lens 330 of the present modification is formed such that both side edges of the emission surface 330*a* bulge in an arc shape toward both left and right sides, it is possible to provide a lamp design having an impression different from that of the above-described embodiment.

In addition, in the cover member 334 of the present modification, since the inner surfaces 334A1 of the front end portions of the pair of left and right side wall surface portions 334A are formed so as to extend in a direction of expanding toward the lamp front with respect to the vertical plane including the optical axis Ax, it is possible to provide, also in this point, a lamp design having an impression different from that of the above-described embodiment and to enhance moldability upon manufacturing of the cover member 334.

Next, a fourth modification of the above-described embodiment will be described.

Figure 7:
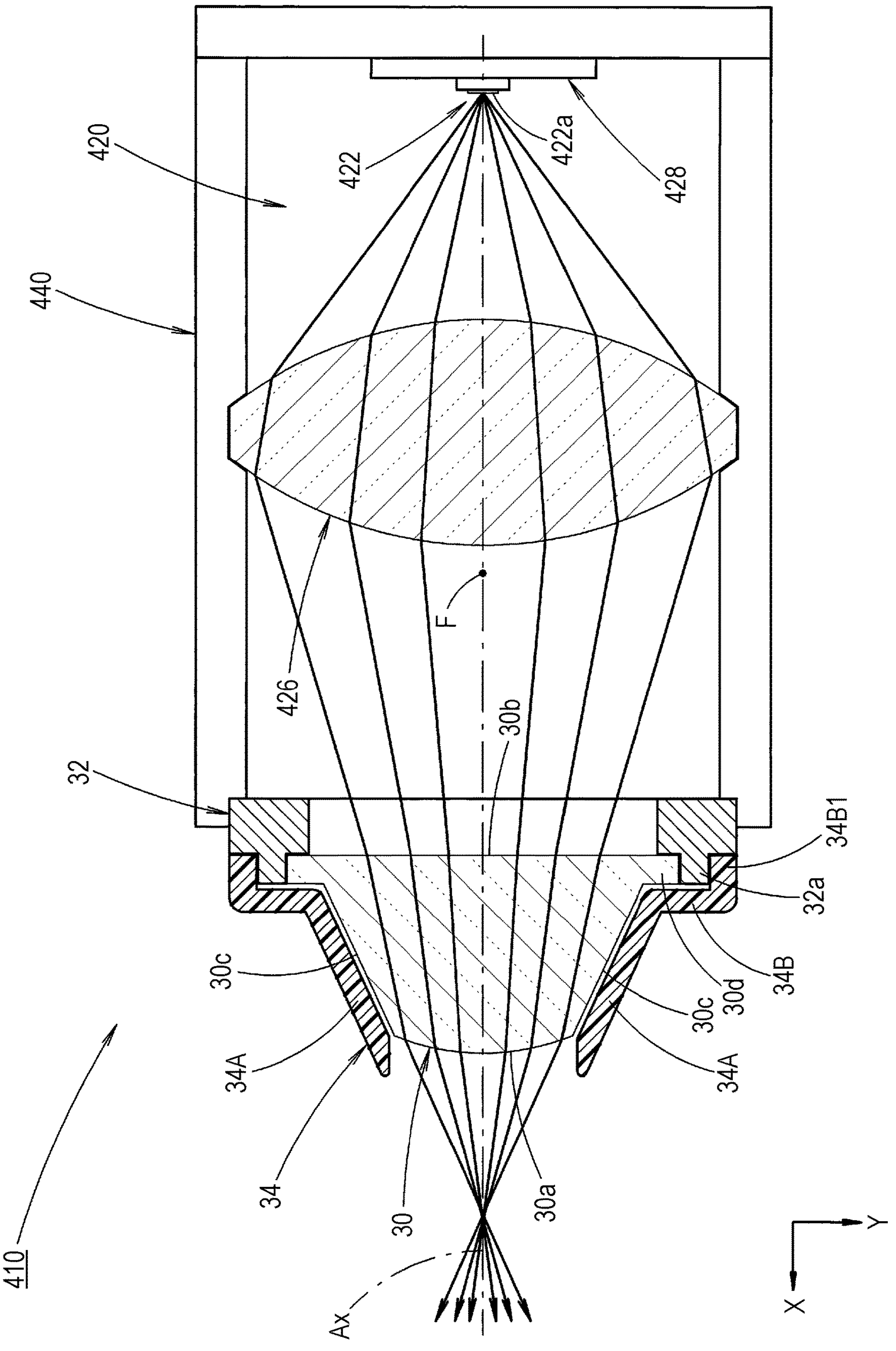
FIG. 7 is a view similar to FIG. 2, which shows a fourth modification of the embodiment.

FIG. 7 is a view similar to FIG. 2, which shows a vehicle lamp 410 according to the present modification.

As shown in FIG. 7, a basic configuration of the present modification is similar to that of the above-described embodiment, but the configuration of a light source unit 420 is different from that of the above-described embodiment, and accordingly, the configuration of a base member 440 is also partially different from that of the above-described embodiment.

That is, the light source unit 420 of the present modification includes a light emitting element 422 as a light source and a condenser lens 426 as an optical member, and is configured to cause light emitted from the light emitting element 422 to enter the projection lens 30 as light converging in the lamp left-right direction by the condenser lens 426.

The condenser lens 426 is supported on the base member 440 at an outer peripheral edge portion thereof in a state of being disposed on the optical axis Ax on the lamp rear side with respect to the rear focal point F of the projection lens 30.

The light emitting element 422 is configured as a white light emitting diode having a horizontally-long rectangular light emitting surface 422*a*, as in the light emitting element 22 of the above-described embodiment. The light emitting element 422 is disposed on the lamp rear side of the condenser lens 426 in a state of the light emitting surface 422*a* being directed to the lamp front on the optical axis Ax. The light emitting element 422 is supported on the base member 440 in a state of being mounted on a substrate 428.

The condenser lens 426 is configured to cause light emitted from the light emitting element 422 to enter the projection lens 30 as light converging to the same extent as reflected light from the reflector 24 of the above-described embodiment in the lamp left-right direction.

In the present modification, for example, a high beam light distribution pattern is formed by light emitted from the vehicle lamp 410.

Even when the configuration of the present modification is employed, the light source unit 420 is also configured to cause the light emitted from the light emitting element 422 to enter the projection lens 30 as the light converging in the lamp left-right direction by the condenser lens 426, and therefore, the light emitted from the light source unit 420 is efficiently taken in from the incident surface 30*b* and guided to the emission surface 230*a* in the projection lens 30 having the vertically-long emission surface 30*a*.

Thus, even when the configuration of the present modification is employed, it is also possible to obtain features and advantageous effects similar to those of the above-described embodiment.

Note that the numerical values indicated as the specifications in the above embodiment and the modifications thereof are merely examples, and naturally the numerical values may be set at different values as appropriate.

Moreover, the invention of the present application is not limited to the configurations described in the above embodiment and the modifications thereof, and it is possible to adopt a configuration to which various modifications other than the configurations described above are added.

The present international application claims priority based on Japanese Patent Application No. 2021-213991 filed on Dec. 28, 2021, and the entire contents of Japanese Patent Application No. 2021-213991 are incorporated herein by reference.

The description of the specific embodiments of the present invention is presented for the purpose of illustration. The specific embodiments are not intended to be exhaustive or to limit the invention as it is in the form described. It is obvious to those skilled in the art that many modifications and alterations are possible in light of the contents of the description above.

LIST OF REFERENCE SIGNS

10, 310, 410 Vehicle lamp
20, 420 Light source unit
22, 422 Light emitting element (Light source)
22*a*, 422*a* Light emitting surface
24 Reflector (Optical member)
24*a* Reflecting surface
30, 130, 230, 330 Projection Lens
30*a*, 130*a*, 230*a*, 330*a* Emission surface
30*b*, 130*b*, 230*b*, 330*b* Incident surface
30*c*, 130*c*, 230*c*, 330*c* Standing wall surface
30*c*1, 130*c*1, 330*c*1 Front edge
30*c*2, 130*c*2, 330*c*2 Rear edge
30*d*, 230*d*, 330*d* Outer peripheral flange portion
32 Lens holder
32*a* Annular protruding portion
34, 334 Cover member
34A, 334A Side wall surface portion
34A1, 334A1 Inner surface
34B, 334B Base end portion
34B1, 334B1 Annular engagement portion
40, 440 Base member
40*a* Upward reflecting surface
40*a*1 Front edge
40*b* Heat dissipation fin
426 Condenser lens (Optical member)
428 Substrate
Ax Optical axis
CL1 Lower cutoff line
CL2 Upper cutoff line
D1, D2 Maximum interval
E Elbow point
F Rear focal point
H Maximum vertical width
PL Low beam light distribution pattern
W Maximum horizontal width

The invention claimed is:

1. A vehicle lamp configured to form a required light distribution pattern by emitting light from a light source unit toward a lamp front through a projection lens, the light source unit including a light source and an optical member configured to cause light emitted from the light source to enter the projection lens as light converging in a lamp left-right direction, and the projection lens including an emission surface having a vertically-long outer shape in a lamp front view, an incident surface formed wider in a right-and-left direction perpendicular to the lamp front than the emission surface, the incident surface being an entire surface to which the light converged by the optical member is capable of entering, and a pair of left and right standing wall surfaces formed so as to expand to both left and right sides while extending from both side edges of the emission surface toward a lamp rear.

2. The vehicle lamp according to claim 1, wherein the pair of left and right standing wall surfaces is configured such that a maximum interval between rear edges is set to a value 1.5 times or more a maximum interval between front edges.

3. The vehicle lamp according to claim 1, wherein each of the pair of left and right standing wall surfaces is configured such that an inclination angle with respect to a vertical plane extending in a lamp front-rear direction is set to a value within a range of 15 to 40°.

4. The vehicle lamp according to claim 1, wherein the emission surface is configured such that a maximum vertical width is set to a value twice or more a maximum horizontal width.

5. The vehicle lamp according to claim 1, wherein a cover member for making at least part of the pair of left and right standing wall surfaces invisible in the lamp front view is disposed on a lamp front side of the projection lens.

6. The vehicle lamp according to claim 5, wherein the cover member is an opaque resin member.

* * * * *